United States Patent
Muñoz De La Torre Alonso et al.

(10) Patent No.: US 12,470,632 B2
(45) Date of Patent: Nov. 11, 2025

(54) TECHNIQUE FOR STORING COOKIE INFORMATION IN A CORE NETWORK DOMAIN OF A WIRELESS COMMUNICATION NETWORK

(71) Applicant: Telefonaktiebolaget LM Ericsson (publ), Stockholm (SE)

(72) Inventors: Miguel Angel Muñoz De La Torre Alonso, Madrid (ES); Alfonso de Jesus Perez Martinez, Madrid (ES); Rodrigo Alvarez Dominguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/682,303

(22) PCT Filed: Nov. 12, 2021

(86) PCT No.: PCT/EP2021/081468
§ 371 (c)(1),
(2) Date: Feb. 8, 2024

(87) PCT Pub. No.: WO2023/036451
PCT Pub. Date: Mar. 16, 2023

(65) Prior Publication Data
US 2025/0133142 A1 Apr. 24, 2025

(30) Foreign Application Priority Data
Sep. 9, 2021 (EP) .................................. 21382811

(51) Int. Cl.
*G06F 15/16* (2006.01)
*H04L 67/141* (2022.01)
*H04L 67/306* (2022.01)

(52) U.S. Cl.
CPC .......... *H04L 67/141* (2013.01); *H04L 67/306* (2013.01)

(58) Field of Classification Search
CPC ........................... H04L 67/141; H04L 67/306
(Continued)

(56) References Cited

U.S. PATENT DOCUMENTS

| 11,025,701 | B1* | 6/2021 | Bansal | H04L 67/02 |
| 2016/0006726 | A1* | 1/2016 | Mizikovsky | H04L 63/061 |
| | | | | 713/171 |
| 2018/0007557 | A1* | 1/2018 | Lee | H04L 67/12 |

FOREIGN PATENT DOCUMENTS

| EP | 3103037 | 12/2016 |
| WO | 2015119909 A1 | 8/2015 |
| WO | 2018064519 A1 | 4/2018 |

OTHER PUBLICATIONS

3rd Generation Partnership Project, "3rd Generation Partnership Project; Technical Specification Group Core Network and Terminals; 5G System; Network Exposure Function Northbound APIs; Stage 3 (Release 17)", Technical Specification, 3GPP TS 29.522, V17.1.0, Mar. 2021, pp. 1-192, 3GPP.

* cited by examiner

*Primary Examiner* — Alan S Chou
(74) *Attorney, Agent, or Firm* — Weisberg I.P. Law, P.A.

(57) ABSTRACT

A technique for handling cookie information in a wireless communication network is presented. According to an exemplary aspect, a method of storing cookie information in a core network domain (CND) of the wireless communication network is presented. The method is performed in the CND and comprises receiving, from an entity in a content provider domain (CPD), a cookie handling request including identification information and cookie information, wherein the identification information is configured to be mapped on (Continued)

a subscription in a subscriber database and wherein the cookie information is configured to control execution of an application hosted in the CPD for a wireless subscriber device associated with the subscription. The method also comprises triggering storage of the cookie information in the CND and in association with the subscription.

20 Claims, 10 Drawing Sheets

(58) Field of Classification Search
USPC .......................................................... 709/227
See application file for complete search history.

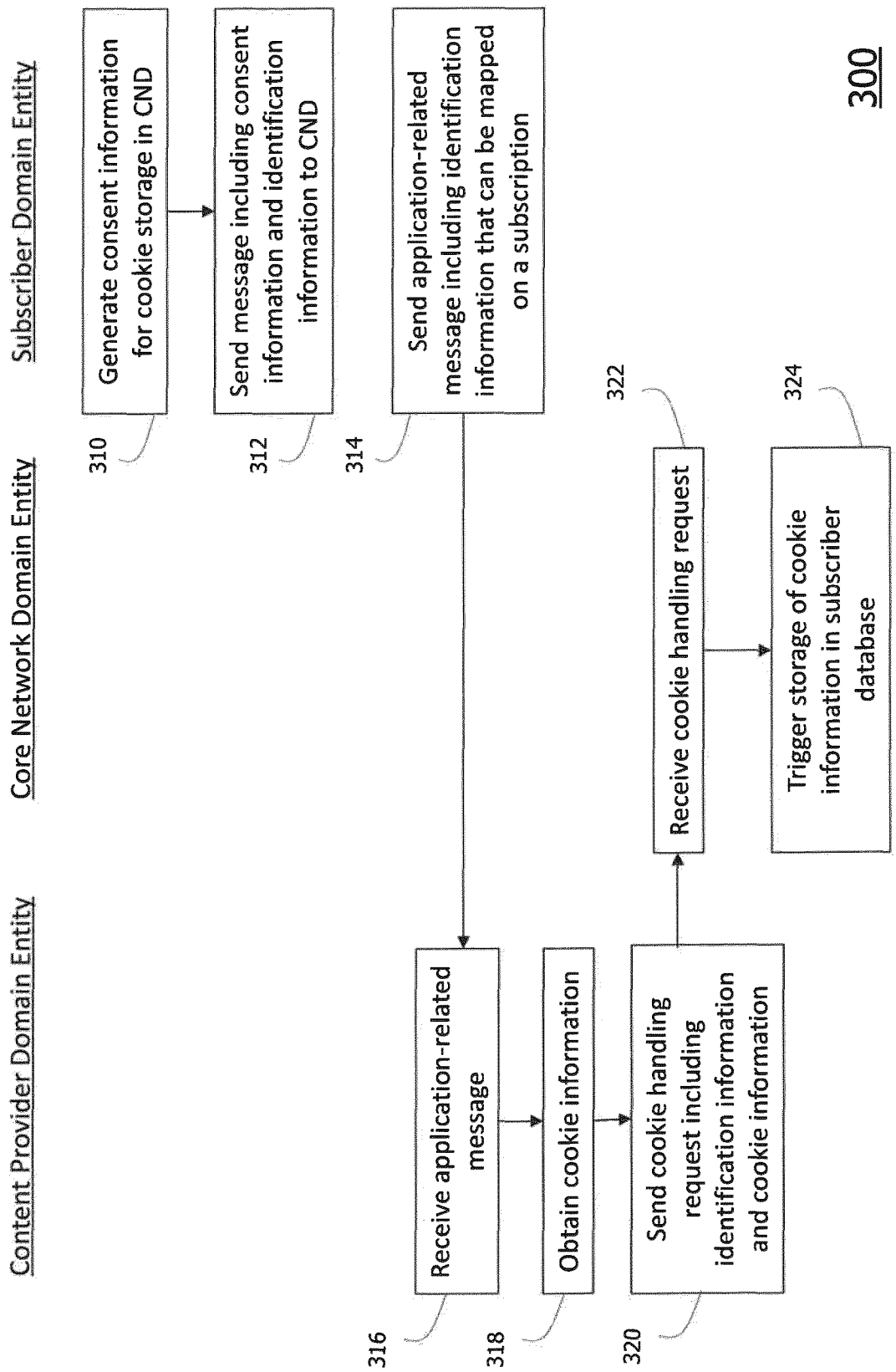

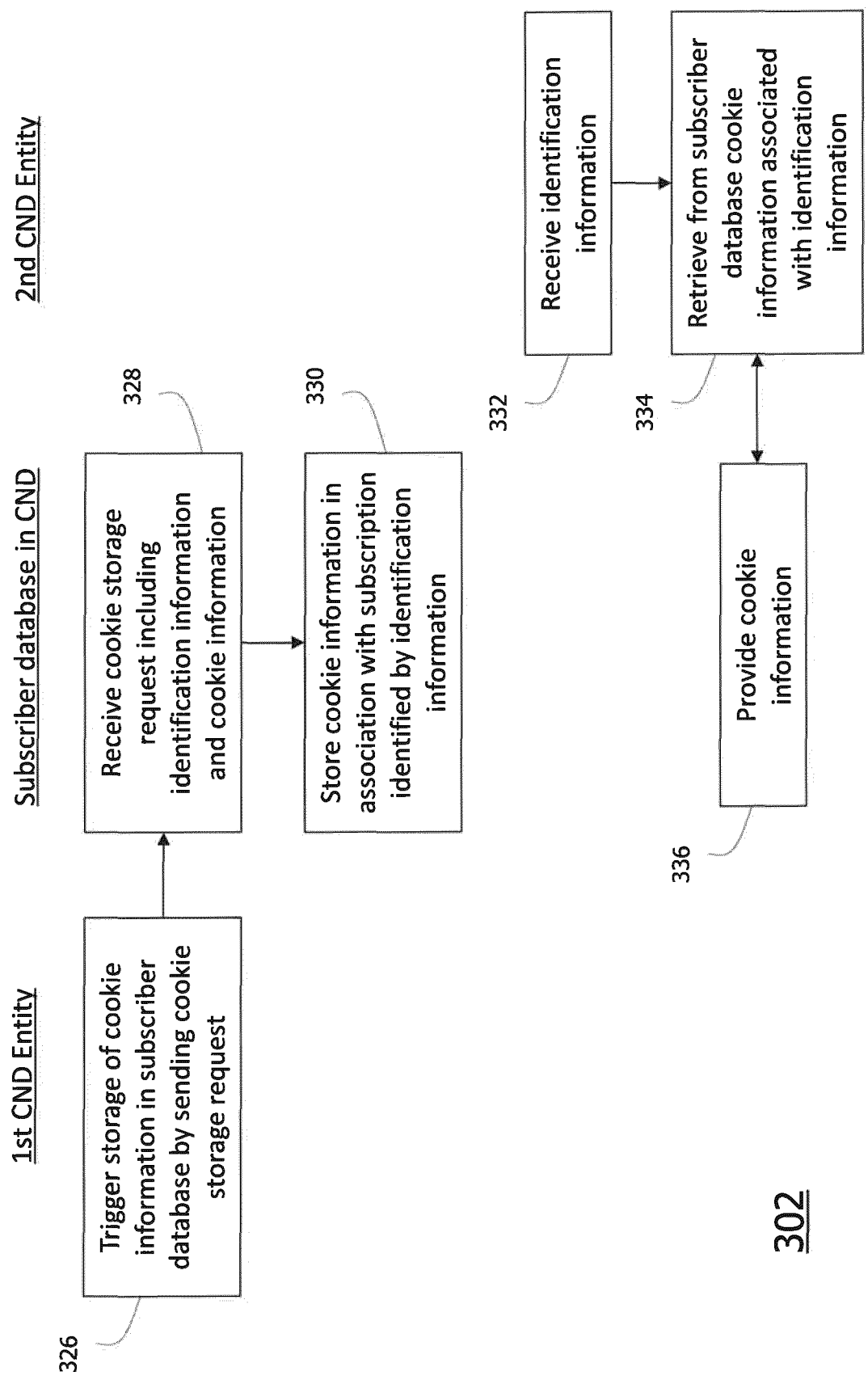

TECHNIQUE FOR STORING COOKIE INFORMATION IN A CORE NETWORK DOMAIN OF A WIRELESS COMMUNICATION NETWORK

TECHNICAL FIELD

The present disclosure generally relates to wireless communication. In more detail, aspects in the context of storing cookie information in a core network domain of a wireless communication network are presented. These aspects can be implemented as methods, computer program products, apparatuses and systems.

BACKGROUND

Cookies are small blocks of textual information typically created by a web server while a user is browsing a website and stored on the user's computer, or other device, by the user's web browser. Cookies serve useful and sometimes essential functions on the web. For example, they enable web servers to store stateful cookie information (such as items added in a shopping cart of an online store) on the user's device or to track a user's browsing activity (including clicking particular buttons, logging in, or recording which pages were visited). Information that a user previously entered into form fields (e.g., name, address, password, or payment card number) of a website can likewise be stored in a cookie for a subsequent use. If the user browses the website again at a later point in time, the web server may send a message to the user's web browser and ask for such pre-stored cookie information, for example to personalize web browsing.

As a basic example, a user may request his or her browser to access the homepage of the website www.example.com. The browser may then send the following Hypertext Transfer Protocol (HTTP) request message to the web server hosting the website:
GET/index.html HTTP/1.1
Host: www.example.com
\*\*\*
The web server responds with an HTTP response message that includes the contents of the homepage of www.example.com. Moreover, the web server may instruct the browser to set (i.e., store) a cookie such as "userId=abdc1234", which contains a user identifier assigned by the web server to the user.
HTTP/1.0 200 OK
Content-type: text/html
Set-Cookie: userId=abcd1234; Expires=Wed, 31 Dec. 2030 23:59:59 GMT
\*\*\*
In the above example, "userId" is a persistent cookie as it contains an Expiry attribute, which instructs the browser to delete the cookie at a specific date and time. As such, this cookie will remain stored on the user's computer, or other device, until it expires.

When, for example after one week, the user again requests his or her browser to access the homepage of www.example.com, the corresponding HTTP request message will contain the cookie information that the web server previously instructed the browser to set:
GET/index.html HTTP/1.1
Host: www.example.com
Cookie: userId=abcd1234
\*\*\*

The web server can subsequently personalize the user experience of www.example.com based on information gathered during the user's previous access of this website.

Cookies have long been considered problematic in regard to Internet privacy, in particular when being used to track a user's browsing behavior. Most of today's browsers therefore allow their users to choose whether or not to accepts cookies, and upcoming browser generations may even lack the possibility to store cookies from third parties. If, however, a browser cannot accept cookies, some websites will effectively become unusable. For example, online shopping websites with cookie-based baskets will not work if the browser cannot store the items to be purchased in cookies. Moreover, many users will appreciate the assistance of cookie-based "auto-complete" functions when repeatedly having to enter data into form fields of websites. Those services will become unavailable in case a browser on a user's computer, or other device, does not accepts cookies.

In other scenarios, a user has multiple different browsers installed on his or her device. In such a case, it can become tedious to ensure that all browsers use the same cookie acceptance settings.

SUMMARY

Accordingly, there is a need for a technique that avoids one more of the above, or other, drawbacks and that enables an efficient handling of cookie information.

According to a first aspect, a method of triggering storage of cookie information in a core network domain (CND) of a wireless communication network is presented. The method is performed in the CND and comprising receiving, from an entity in a content provider domain (CPD), a cookie handling request including identification information and cookie information, wherein the identification information is configured to be mapped on a subscription in a subscriber database and wherein the cookie information is configured to control execution of an application hosted in the CPD for a wireless subscriber device associated with the subscription. The method also comprises triggering storage of the cookie information in the CND and in association with the subscription.

In some variants, the cookie information consists of textual information. For example, the cookie information may be received in the form of a list of one or more cookies, each cookie containing a dedicated item of cookie information. The cookie information may be stateful information from the perspective of the application (e.g., related to a particular application session).

The cookie information may be indicative of an interaction between the application and the subscriber device. The interaction may be a start of the application (and the cookie information may, e.g., be a user identifier assigned by the application to the subscriber device having started the application), provision of user data to be processed by the application (and the cookie information may include or be derived responsive to the user data), and so on.

In some cases, triggering storage of the cookie information comprises sending a cookie storage request to the CND (e.g., to the subscriber database in the CND). The cookie storage request may include the identification information, or information derived therefrom (e.g., via a mapping or other processing operation), and the cookie information.

The cookie handling request may includes one or more of (i) an application identifier of the application hosted in the CPD, (ii) an identifier of server hosting the application (e.g., an identifier of an application server, AS, or an application function, AF), and (iii) a specification of a cookie handling-related service. The server may be realized as a content server. The server may be the CPD entity from which the cookie handling request is received.

In some examples, the cookie handling request includes the application identifier to trigger storage of the cookie information in the subscriber database in association with the application identifier (e.g., linked with the application identifier or in the same data record). In such or other examples, the specification of the cookie handling-related service may refers to one of (i) setting the cookie information in the subscriber database and (ii) updating cookie information stored in the subscriber database with the cookie information included in the cookie handling request.

The cookie handling request may received from the CPD entity responsive to the subscriber device interacting with the application in the CPD. The interaction may be an opening, or a start, of the application or may occur after the application has been opened, or started.

The cookie handling request may be received via an application programming interface (API). The API may be one of (i) dedicated to cookie management, including cookie setting and cookie updating, (ii) dedicated to cookie setting, and (iii) dedicated to cookie updating. The cookie handling may is received by a network exposure function (NEF) of a $5^{th}$ Generation-, 5G-, enabled CND or a service capability exposure function gateway (SCEF) of a $4^{th}$ Generation-, 4G-, enabled CND.

The method of the first aspect may comprise authorizing the cookie handling request to obtain an authorization result. Storage of the cookie information in the subscriber database may be triggered dependent on the authorization result. If, for example, the result is negative, storage may not be triggered (and vice versa). Authorizing the cookie handling request may include checking existence of at least one of (i) a service level agreement (SLA) between an operator of the CND and an operator of the CPD, and (ii) subscriber consent to cookie storage in the CND. In some implementations one or more applications are hosted in the CPD, and at least one of the SLA and the subscriber consent may be on a per-application basis.

The cookie handling request may includes an information request for at least one of (i) subscription information stored in the subscriber database and (ii) network-related information pertaining to the wireless communication network. In such a case, the information request may relates to one or more of a mobile country code (MCC), a mobile network code (MNC), a public user identity (PUI), a mobile station integrated services network (MSISDN identifier, and a public land mobile network (PLMN) identifier. The information request may trigger that the corresponding information be added to the cookie information as stored in the subscriber database. As such, upon retrieval of the cookie information, the requested information will be retrieved as well and can be send to the content provider domain.

In one variant, the identification information is an internet protocol (IP) address assigned to the subscriber device. The method of the first aspect may then comprise mapping the IP address on a subscription identifier prior to triggering storage of the cookie information in the subscriber database. The subscription identifier can be a subscription permanent identifier (SUPI) or an international mobile subscriber identifier (IMSI), i.e., another kind of identification information. In some variants the mapping may be trivial, for example if the identification information is the subscription identifier.

The subscriber database may be hosted by a unified data repository (UDR) of a 5G-enabled CND or by a home subscriber server (HSS) 4G-enabled CND. The cookie information may be stored as application data in the subscriber database.

A second aspect relates to a method of providing cookie information from a CPD to a CND of a wireless communication network. The method is performed in the CPD and comprises receiving, from a wireless subscriber device associated with a subscription in a subscriber database located in the CND, a message relating to an application hosted in the CPD, wherein the message includes identification information configured to be mapped on the subscription. The method also comprises obtaining cookie information configured to control execution of the application for the subscriber device. Further still, the method comprises sending, to an entity in the CND, a cookie handling request including the identification information, or information derived therefrom, and the cookie information, wherein the cookie handling request is directed at cookie handling in the CND.

The cookie handling request includes a specification of a cookie handling-related service to be executed in the CND. The specification of the cookie handling-related service can refer to one of (i) setting the cookie information in the CND and (ii) updating cookie information stored in the CND with the cookie information included in the cookie handling request. The cookie handling request may include an information request for at least one of (i) subscription information stored in the subscriber database and (ii) network-related information pertaining to the wireless communication network. The method of the second aspect may then comprise receiving the requested information from the CND.

The method of the second aspect may further comprise receiving, from the CND entity, the cookie information as previously sent with the cookie handling request, and controlling execution of the application for the subscriber device in accordance with the received cookie information. The requested information may be received together with the cookie information. In some implementations, the cookie information is first obtained upon a first interaction between the subscriber device and the application, and the later received cookie information controls execution of the application upon a second, later interaction between the subscriber device and the application. The first interaction may comprise opening the application a first time and the second interaction comprises opening the application a second time.

A third aspect of the present disclosure relates to a method of storing cookie information in a CND of a wireless communication network. The method is performed in the CND and comprises receiving a cookie storage request including identification information and cookie information, wherein the identification information is configured to be mapped on a subscription in the subscriber database and wherein the cookie information is configured to control execution of an application hosted in a CPD for a wireless subscriber device associated with the subscription. The method also comprises storing the cookie information in the CND and in association with the subscription.

In the method of the third aspect, the identification information may comprise a subscription identifier such as SUPI or IMSI. The cookie storage request may include an application identifier of the application hosted in the CPD. The method may comprise storing the cookie information in association with the application identifier.

The method of the third aspect may at least partially be performed by a UDR of a 5G-enabled CND or by an HSS of a 4G-enabled CND.

A fourth aspect relates to a method of retrieving cookie information from an entity located in a CND of a wireless communication network. The method is performed in the CND and comprises receiving identification information configured to be mapped on a subscription in the subscriber database. The method also comprises retrieving, from the entity in the CND and based on the identification information, cookie information configured to control execution of an application hosted in a CPD for a wireless subscriber device associated with the subscription.

The method of the fourth aspect may also comprise receiving an application identifier of the application hosted in the CPD and performing at least one of the following steps (i) configuring, based on the application identifier, a user plane entity of the CND to send an event message upon detecting an event relating to the application, and (ii) retrieving the particular cookie information that is associated with the application identifier.

The method of the fourth aspect may also comprise triggering forwarding of the cookie information towards the CPD. Forwarding of the cookie information towards the CPD may be triggered by receipt of the event message. In some variants, triggering forwarding of the cookie information to the CPD comprises sending the cookie information to a CND entity interfacing the CPD.

The method of the fourth aspect may also comprise receiving the identification information in a policy control message. The policy control message may be triggered by session establishment by the subscriber device.

The method of the fourth aspect may at least partially performed by a policy control function (PCF) of a 5G-enabled CND or a control plane packet data network gateway (PGW-C) of a 4G-enabled CND. The subscriber database may be hosted by a UDR of a 5G-enabled CND or by an HSS, of a 4G-enabled CND.

A fifth aspect of the present disclosure relates to a method of controlling storage of cookie information in a CND of a wireless communication network. The method is performed by a wireless subscriber device and comprises generating consent information pertaining to storage of cookie information in the CND, wherein the cookie information is configured to control execution of an application hosted in a CPD for the subscriber device. The method also comprises sending a message including the consent information and identification information to the CPD, wherein the identification is configured to be mapped on a subscription associated with the subscriber device in the subscriber database.

The message including the consent information and the identification information may pertain to session establishment. The identification information may comprises a SUPI or IMSI.

Also provided is a computer program product comprising program code portions to perform the steps of any preceding claim when executed on one or more processors. The computer program product may be stored on a computer-readable recording medium.

A first apparatus aspect is directed to an apparatus for of triggering storage of cookie information in a CND of a wireless communication network. The apparatus is a CND entity and configured to receive, from an entity in a CPD, a cookie handling request including identification information and cookie information, wherein the identification information is configured to be mapped on a subscription in a subscriber database and wherein the cookie information is configured to control execution of an application hosted in the CPD for a wireless subscriber device associated with the subscription. The apparatus is configured further to trigger storage of the cookie information in the CND and in association with the subscription.

A second apparatus aspect is directed to an apparatus for providing cookie information from a CPD to a CND of a wireless communication network. The apparatus is a CPD entity and configured to receive, from a wireless subscriber device associated with a subscription in a subscriber database located in the CND, a message relating to an application hosted in the CPD, wherein the message includes identification information configured to be mapped on the subscription. The apparatus is further configured to obtain cookie information configured to control execution of the application for the subscriber device, and to send, to an entity in the CND, a cookie handling request including the identification information, or information derived therefrom, and the cookie information, wherein the cookie handling request is directed at cookie handling in the CND.

A third apparatus aspect is directed to an apparatus for storing cookie information in a CND of a wireless communication network. The apparatus is a CND entity and configured to receive a cookie storage request including identification information and cookie information, wherein the identification information is configured to be mapped on a subscription in the subscriber database and wherein the cookie information is configured to control execution of an application hosted in a CPD for a wireless subscriber device associated with the subscription. The apparatus is also configured to store the cookie information in the CND and in association with the subscription.

A fourth apparatus aspect is directed to an apparatus for retrieving cookie information from an entity located in a CND of a wireless communication network. The apparatus is another CND entity and configured to receive identification information configured to be mapped on a subscription in the subscriber database. The apparatus is also configured to retrieve, from the entity in the CND and based on the identification information, cookie information configured to control execution of an application hosted in a CPD for a wireless subscriber device associated with the subscription.

A fifth apparatus aspect is directed to a subscriber device for controlling storage of cookie information in a CND of a wireless communication network. The subscriber device is configured to generate consent information pertaining to storage of cookie information in the CND, wherein the cookie information is configured to control execution of an application hosted in a CPD for the subscriber device. The subscriber device is further configured to send a message including the consent information and identification information to the CPD, wherein the identification is configured to be mapped on a subscription associated with the subscriber device in the subscriber database.

The apparatus of the first apparatus. aspect may be configured to perform the steps of the first method aspect, and similar consideration apply to the respective apparatus of the second, third, fourth and fifth aspect.

Also provided is a network system comprising two or more of the storage triggering apparatus of the first aspect, the cookie information provisioning apparatus of the second aspect, the cookie information storing apparatus of the third aspect, the cookie information retrieving apparatus of the fourth aspect, and the subscriber device of the fifth apparatus aspect.

BRIEF DESCRIPTION OF THE DRAWINGS

Further aspects, details and advantages of the present disclosure will become apparent from the detailed description of exemplary embodiments below and from the drawings, wherein:

FIGS. 3A, 3B are flow diagrams illustrating method realizations of the present disclosure;

DETAILED DESCRIPTION

Figure 1:
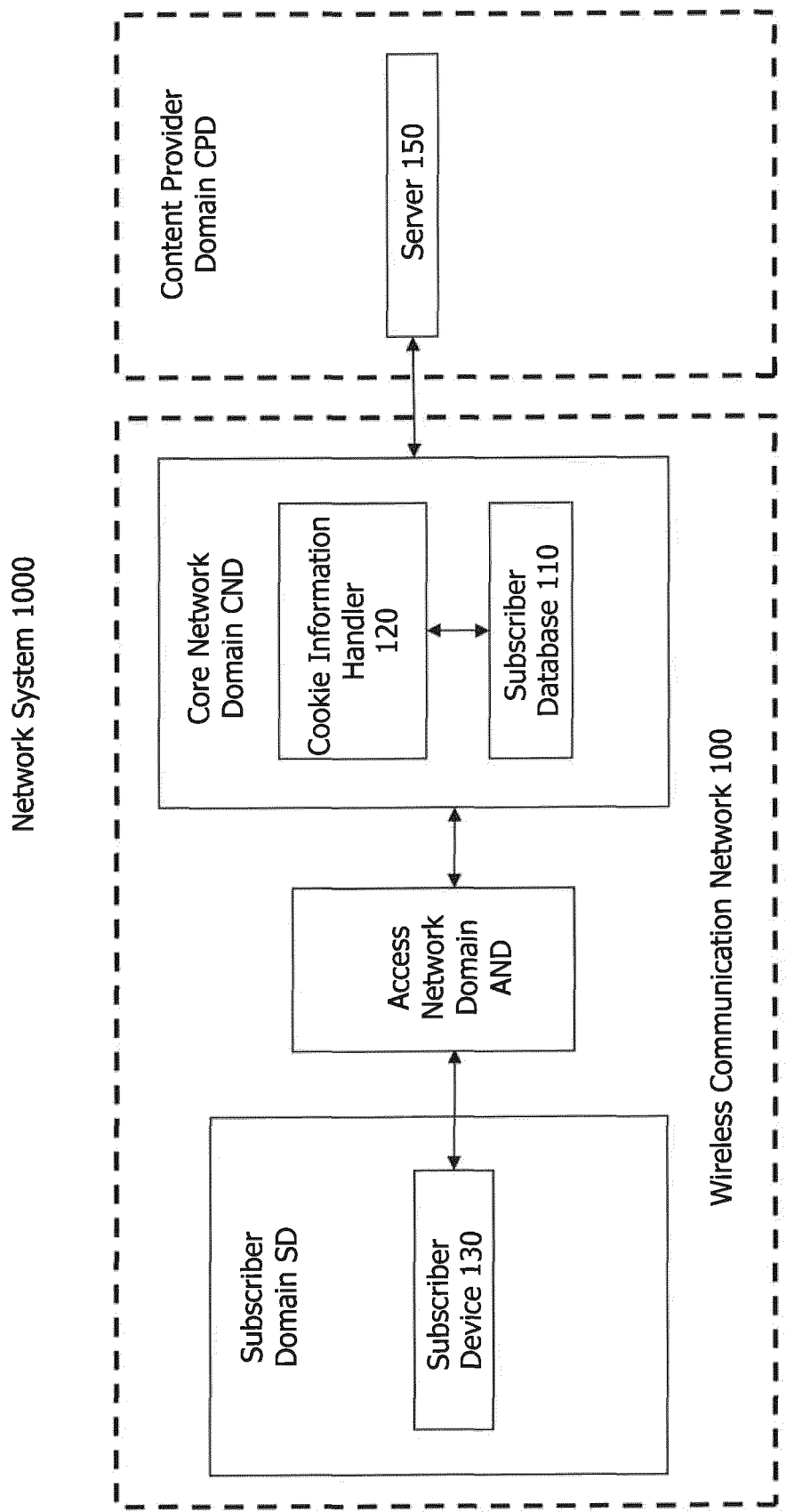
FIG. 1 is a diagram illustrating a network system realization of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could, for example, also be implemented in other cellular or non-cellular wireless communication networks having a core network domain, such as those complying with 4G specifications (e.g., in accordance with the Long Term Evolution, LTE, specifications as standardized by the 3$^{rd}$ Generation Partnership Project, 3GPP).

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

Mobile network operators (MNOs) today apply different traffic management actions, one of them being content enrichment, such as HTTP header enrichment, to transport information (e.g., a public user identity, PUI) towards a content provider domain (e.g., a content provider's application server). However, HTTP header enrichment suffers from various drawbacks. For example, it is currently not possible for a user plane entity in the core network domain to apply HTTP header enrichment for encrypted traffic, such as secure HTTP (HTTPS) traffic (e.g., traffic conforming to HTTP/HTTP2 over the transport layer security (TLS) protocol). The same applies for QUIC based-traffic (HTTP3 over QUIC), such as YouTube traffic. Evidently, HTTP header enrichment can likewise not be used for non-HTTP traffic. For these, and other, reasons, the existing core network instruments that could potentially be used for user identification and other cookie-based mechanisms are not particularly suitable to emulate the function of browser cookies, and alternative instruments would be desirable.

In the following description, various aspects associated with storage of cookie information in a core network domain of a wireless communication network are presented. In more detail, it is suggested to store the cookie information in a subscriber database or other entity that forms an integral part of the core network domain, and in association with a subscription. Storage of cookie information in the core network domain in association with a subscription includes storage of the cookie information in a subscriber database record that comprises other subscriber-related information, but also includes storage of the cookie information in a separate database such that it can be accessed via (e.g., information stored in) the subscriber database.

As will become apparent form the following realizations of the present disclosure, the technique presented herein allows the implementation of cookie-related mechanisms, such as user identification (possibly anonymized), also in the scenario of encrypted or non-HTTP traffic for which HTTP header enrichment is not possible. In some variants of the present disclosure, MNOs are enabled to convey MNO data (e.g., from the subscriber database or from another database) to a content provider for an application session. The content provider might request such MNO data and, based on policies, the MNO might include extra parameters (e.g., to identify the user or to expose MNO data like user's remaining monthly data quota) in a cookie-related context.

The technique presented herein does not rely on browsers, but instead it involves the core network domain. It works seamlessly among browsers and in certain use cases provides extra benefits. For example, every single browser (e.g., Chrome, Firefox, Safari) installed by a user will store cookies for a certain domain (i.e., one cookie per browser), which is inefficient. In certain realizations of the present disclosure, the cookie information for a certain domain is only stored once in the core network domain, and it need not be stored on a user's device (so both memory and CPU resources to handle cookies are saved on the user's device, which is particularly advantageous for battery-operated devices).

Also, the technique presented herein helps to improve Internet privacy. For example, a browser might send (and even sell) cookie information to external third parties different from the content provider operating the web server that generated the cookie information. The technique presented herein is more secure in that it can better be ensured that cookie information is only sent to the intended party. Additionally, the technique presented herein supports user consent without the need of continuous pop-up windows to request the user to accept cookie installation for different sites.

In some 3GPP-compliant variants of the realizations described hereinafter, the existing 3GPP exposure framework is extended by a new interface, such as a new API, between the core network domain and the content provider domain. In an exemplary 5G-enabled realization, such an interface may be provided between an network exposure function (NEF) of the content provider domain and an application function (AF) of the content provider domain. Such an interface could also be provided in a 4G-enabled realization, for example between a service capability exposure function gateway (SCEF) of the content provider domain and an application server (AS) of the content provider domain. Evidently, the present disclosure is not limited to 3GPP-compliant wireless communication networks.

In the following description of exemplary realizations of the present disclosure, the same reference numerals denote the same or similar components.

FIG. 1 illustrates an embodiment of a network system 1000 in which the present disclosure can be realized.

As shown in FIG. 1, the network system 1000 comprises a wireless communication network 100 operated by a network operator. The communication network 100 may be a mobile communication network, in which case the operator will be an MNO.

The wireless communication system 100 of FIG. 1 comprises a subscriber domain SD, a core network domain CND and an access network domain AND. In some variants, each of these three domains is split into a user plane for transporting service traffic and a control plane for transporting control signalling. As understood herein, a particular domain comprises one or more devices, nodes or functions (as exemplary entities) under control of a particular domain owner, such as a subscriber, an MNO or a content provider.

The core network domain CND and the access network domain AND each comprises one or more network nodes or network functions (NFs). For example, the access network domain AND may comprise one or more access points or base stations (not shown) configured to establish one or more wireless communication links to the subscriber domain SD. The core network domain CND comprises, among others, a subscriber database 110 that contains subscription information (e.g., in the form of subscriber data records). The core network domain CND further comprises a cookie information handler 120 configured to directly or indirectly (i.e., via other network nodes or network functions) communicate with the subscriber database 110 (e.g., to write information into and read information from the subscriber database 110). The cookie information handler 120 may be realized by one or more network nodes or NFs of the core network domain CND.

The subscriber domain SD comprises one or more subscriber devices 130 configured to wirelessly communicate with the access network domain AND under a subscription regime. Exemplary subscriber devices 130 comprise a user equipment-(UE-) type device with wireless communication capabilities towards the access network domain AND. A subscriber device 130 may be realized as a smartphone, a tablet, a television set with a mobile broadband (MBB)-type of subscription or an Internet of Things- (IoT-) type device (e.g., a car or a wearable device such as a head-, hand- or body-mounted device) with an IoT-type of subscription.

With reference to FIG. 1, the network system 1000 further comprises a content provider domain CPD with a server 150 (e.g., a web server offering media download or media streaming services, online shopping services, news services and so on) operated by a content provider. The server 150 is configured to transmit digital content to the subscriber device 130, via the core network domain CND and the access network domain AND. The digital content may comprise media (e.g., audio or video data), website content, and so on. In some implementations, the server 150 may logically be considered as a (e.g., trusted) component of the core network domain CND while being operated by the content provider (i.e., not the MNO) and, thus, at the same time belonging to the content provider domain CPD.

Figure 2:
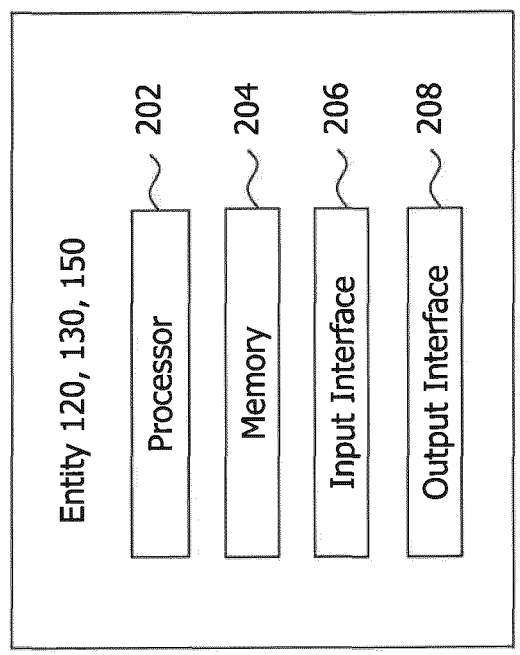
FIG. 2 is a block diagram illustrating exemplary apparatus realizations of the present disclosure.

In the following, exemplary realizations of each of the cookie information handler 120, the subscriber device 130 and the server 150 will be explained with reference to FIG. 2. As illustrated in FIG. 2, in one possible hardware implementation, each of the entities 120, 130 and 150 comprises a processor 202 and a memory 204 coupled to the processor 202. The memory 204 stores program code that controls operation of the processor 202 to implement aspects of the present disclosure. As understood herein, a processor, such as the processor 202, may be implemented using any processing circuitry and is not limited to, for example, a single processing core but may, for example, also have a distributed topology.

Each of the entities 120, 130 and 150 further comprises an optional input interface 206 and an optional output interface 208 for communication with each other and with further entities in the network system 1000 of FIG. 1. As an example, the input and output interfaces 206, 208 of the cookie information handler 120 allow that entity 120 to obtain (e.g., retrieve) cookie information from the subscriber database 110 or another database in the core network domain CND, and to store cookie information in the subscriber database 110 or in the database in the core network domain CND (but then in association, e.g., linked with, with a subscription in the subscriber database 110). Additionally, those interfaces 206, 208 allow the cookie information handler 120 to receive information from, and transmit information to, one or both of the subscriber domain SD and the content provider domain CPD. As a further example, the input and output interfaces 206, 208 of the subscriber device 130 may permit a wireless communication with the access network domain AND.

The cookie information is generally configured to control execution of an application hosted by the server 150 for the subscriber device 130. In some variants, the cookie information corresponds to the information contained in a regular Internet cookie as typically generated by a web server. As such, the cookie information may consist of textual information and, optionally, may include statful information for the application that is to be controlled. The cookie information may be generated and handled (e.g., processed, forwarded, stored, etc.) in the form of a list with one or more cookie items, each cookie item containing dedicated cookie information (e.g., representing a dedicated cookie). Since the cookie information will be stored in the core network domain CND, it can also be referred to as being comprised by a "network" cookie (in contrast to a "browser" cookie as stored locally by a browser).

The cookie information may be indicative of an interaction between the application hosted on the server 150 and the subscriber device 130. Such an interaction may be application start or an application-specific interaction (such as putting an item into a cookie-based shopping cart, entering data in to a form field of a website, etc.). The cookie information may be generated in the context of (e.g., responsive to) the interaction.

Exemplary modes of operation of the cookie information handler 120, as an entity in the core network domain CND, the subscriber device 130, as an entity in the subscriber domain SD, and the server 150, as an entity in the content provider domain CPD, will now be described with reference to flow diagrams 300 and 302 of FIGS. 3 and 4, respectively.

The subscriber device 130 is configured to control storage of cookie information in a subscriber database 110 or in another database of the wireless communication network 100. That is, such storage will only be performed in case a subscriber, via the subscriber device 130, has given his or her consent to cookie information storage in the core network domain CND. To this end, as indicated by step 310, the subscriber device 130 generates consent information pertaining to storage of cookie information in the core network domain CND. The consent information may be a text string such as "cookie storage consent=yes" or "cookie storage consent=no".

Then, in step 312, the subscriber device 130 sends a message including the consent information and identification information to the content provider domain CPD (e.g., to the server 150 or another entity in the content provider domain CPD). The identification information is configured to be mapped on a subscription associated with the subscriber device 130 in the subscriber database 110. As an example, the identification information can be an internet protocol (IP) address assigned to the subscriber device 130 and that can be mapped on a subscription identifier (or other identification information), such as a SUPI. In some variants, the identification information itself is the subscription identifier and, thus, can directly be mapped on a subscription.

The consent information may then be stored in the subscriber database 130 for later use in the context of cookie information handling. Details in this regard will be described below (e.g., with reference to step 5) in FIG. 5A).

In some variants, steps 310 and 312 are performed in a dedicated signalling procedure triggered by the core network domain CND. In other variants, steps 310 and 312 take place via a MNO's web server (using, e.g., HTTP messaging) when the subscriber updates his subscription data via a web interface.

If a subscriber has given his or her consent to storage of cookie information in the core network domain CND, cookie information from the content provider domain CPD may be stored in the subscriber database 110 or other database in the core network domain CND as follows. In step 314, the subscriber device 130 sends a message related to an application hosted in the content provider domain CPD to an entity in the content provider domain CPD, such as to the server 150 hosting the application. The message can be encrypted and relate to an interaction between the application hosted on the server 150 and the subscriber device 130, such as the subscriber device 130 starting the application or entering data to be processed by the application. Moreover, the message includes identification information configured to be mapped on the subscriber's subscription, such as an IP address that can be mapped to a SUPI as associated with a corresponding subscription record in the subscriber database 110. It should be noted that the content provider domain CPD may already be in possession of the identification information and may merely use the identification information received in step 316 to associate the received message with, for example, a particular session.

The message is received by the server 150 or other entity in the content provider domain CPD in step 316. In step 318, the corresponding CPD entity obtains cookie information configured to control execution of the application for the subscriber device. Depending on the preceding interaction between the application hosted on the server 150 and the subscriber device 130, this cookie information may be textual information indicative, for example, of an item put into a cookie-based shopping basket, or indicative of data entered by the user in a form field of a website, or an application-specific user identifier assigned upon start of the application.

Then, in step 320, a cookie handling request is sent to an entity in the core network domain CND (e.g., to the cookie information handler 120). The cookie handling request includes the identification information, or information derived therefrom, and the cookie information. The cookie handling request is directed at cookie handling in the core network domain CND. In some variants, the cookie handling request includes a specification of a cookie handling-related service to be executed in the core network domain CND. The specification of the cookie handling-related service can request setting the cookie information in the subscriber database 110 or updating of cookie information stored in the subscriber database 110 with the cookie information included in the cookie handling request.

The cookie handling request may also include one or both of an application identifier of the application that has interacted with the subscriber device 130 and an identifier of the server 150 that may host the application. Moreover, in some cases, the cookie handling request includes an information request for at least one of (i) subscription information stored in the subscriber database 110 and (ii) network-related information pertaining to the wireless communication network 100. Specifically, the information request can relates to one or more of requesting a mobile country code (MCC), a mobile network code (MNC), a public user identity (PUI), a mobile station integrated services network (MSISDN) identifier, and a public land mobile network (PLMN) identifier as stored in the subscriber database 110. Such information may be added or otherwise associated with the cookie information (e.g., in the subscriber database 110) such that it can be retrieved at a later point in time together with the cookie information.

In step 322, the cookie handling request including (at least) the identification information and the cookie information is received by an entity in the content provider domain CPD, such as the cookie information handler 120. As explained above, the identification information is configured to be mapped on a subscription in the subscriber database 110 and the cookie information is configured to control execution of an application hosted in the content provider domain CPD for the subscriber device 130 that sent the application-related message in step 314. In some variants, the cookie handling request is received in step 322 via a dedicated API. The API may be dedicated to one of (i) cookie management, including cookie setting and cookie updating, (ii) dedicated to cookie setting, and (iii) dedicated to cookie updating.

In step 324, the cookie information handler 120 or other core network domain entity triggers storage of the cookie information in the core network domain (e.g., in the subscriber database 110) and in association with, e.g., in a manner linked with, the subscription of the subscriber device 130. Such linking between different data records or different databases can be performed using SUPI or another other subscription identifier such as the international mobile subscriber identifier (IMSI). Of course, the cookie information could also be stored in a subscriber data record of the subscriber database 110 itself.

Prior to triggering cookie information storage, the cookie handling request may be authorized in the core network domain CND to obtain an authorization result, so that storage of the cookie information in the core network domain CND may be triggered dependent on the authorization result. Authorizing the cookie handling request can include checking existence of at least one of (i) an SLA between the MNO and an operator of the content provider domain CPD (i.e., the content provider) and (ii) subscriber consent to cookie storage in the core network domain CND (see steps 310 and 312 above).

Storage of the cookie information may depend on a specification of a cookie handling-related service in the cookie handling request or on the dedicated API via which the cookie handling request has been received. For example, cookie information storage may either comprise setting the cookie information in the subscriber database 110 (assuming that no cookie information is currently stored for the particular application and/or server 150) or updating existing cookie information in the subscriber database 110.

In the following, certain cookie handling procedures performed in the core network domain CND will be described with reference to the flow diagram 302 of FIG. 3B. It will be assumed that the core network domain CND comprises at least the subscriber database 110 and two further entities, such as two instances of the cookie information handler 120. In some variants, a first one of these entities may be a gateway towards the content provider domain CPD. A second one of these entities may be in charge of setting rules in the core network domain for detection of service traffic and enforcement of policy and charging decisions.

In step 326, which in certain variants may correspond to step 324 of FIG. 3A, storage of cookie information in the core network provider domain (in the present example: in the subscriber database 110) is triggered by sending a cookie storage request from the first entity in the core network domain CND to the subscriber database 110. The cookie storage request includes identification information and cookie information. As has been explained with reference to FIG. 3A, the identification information (e.g., an IP address of a subscriber device 130) is configured to be mapped (e.g., using a network address translation, NAT, table) on a subscription in the subscriber database 110. The cookie information, on the other hand, is configured to control execution of an application hosted in the content provider domain CPD for the subscriber device 130 associated with the subscription.

The cookie storage request is received by the subscriber database 110 in step 328 and stored therein in step 330. The cookie information will be stored in the subscriber database 110 in association with the subscription maintained for the subscriber device 130 that is associated with the identification information included in the cookie storage request. As an example, the cookie information may be entered in a dedicated new field of a subscription record. In case the cookie storage request includes an application identifier of the application for which cookie information is to be stored, the cookie information may as well be stored in the subscriber database 110 (e.g., in association with the application identifier to allow for a corresponding filtering).

It is to be noted that the cookie information could also be stored in a core network domain database different from the subscriber database 110 as long as the cookie information can still be associated with a dedicated subscription (e.g., via SUPI or IMSI as common data field in both databases) and, thus, be looked up for later retrieval.

At some later time, it may be desired to retrieve the cookie information from the subscriber database 110 again. Such a situation may occur if the subscriber device 130 has another interaction with the application for which cookie information has been stored, in particular at a later point in time (e.g., after a day or a week) after an earlier application session has been terminated.

Therefore, in step 332, the second entity in the core network domain CND receives identification information configured to be mapped on a subscription in the subscriber database 110 for which cookie information is to be retrieved. The identification information, such as a SUPI or an IP address that can be mapped on a SUPI, may be received from the first entity in the core network domain CND, which may again have been triggered by the server 150 or another entity in the content provider domain CPD (e.g., by a request that includes an IP address of the subscriber terminal 130 for which cookie information is to be retrieved, wherein the first entity has mapped the IP address to the associated SUPI). In step 332, also one or both of an application identifier and an identifier of the server 150 may be received.

Then, based on the identification information, the second entity in the core network domain CND retrieves the requested cookie information from the subscriber database 110 in step 334, wherein the subscriber database provides the cookie information in step 336. In case one or both of an application identifier and an identifier of the server 150 have been received in step 334, the specific cookie information associated in the subscriber database 110 with one or both of these identifiers is retrieved. The cookie information thus retrieved may then be sent towards the content provider domain CPD so as to control execution of the associated application for the wireless subscriber device 130 associated with the subscription.

If the cookie handling request (see steps 320 and 322) included an information request for subscription information (as contained in the subscriber database 110) or network-related information (e.g., as generally available in the core network domain CND), the requested information may additionally be retrieved from the subscriber database 110 or other database and forwarded to the content provider domain CPD. As explained above, such information may include one or more an MCC, an MNC, a PUI, an MSISDN identifier, and a PLMN identifier.

The above general realizations of the present disclosure will now be described in greater detail with reference to certain technical specifications (TSs) defined by the 3rd Generation Partnership Project (3GPP) for 5G communication systems. 3GPP TS 23.501 V15.4.0 (2018-12) and later defines architectural aspects of a 5G service based architecture (SBA). According to this SBA, network functions (NF) use service-based interactions to consume services from other NFs. The discovery of services and of NFs producing them is provided by a network repository function (NRF). Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

Figure 4:
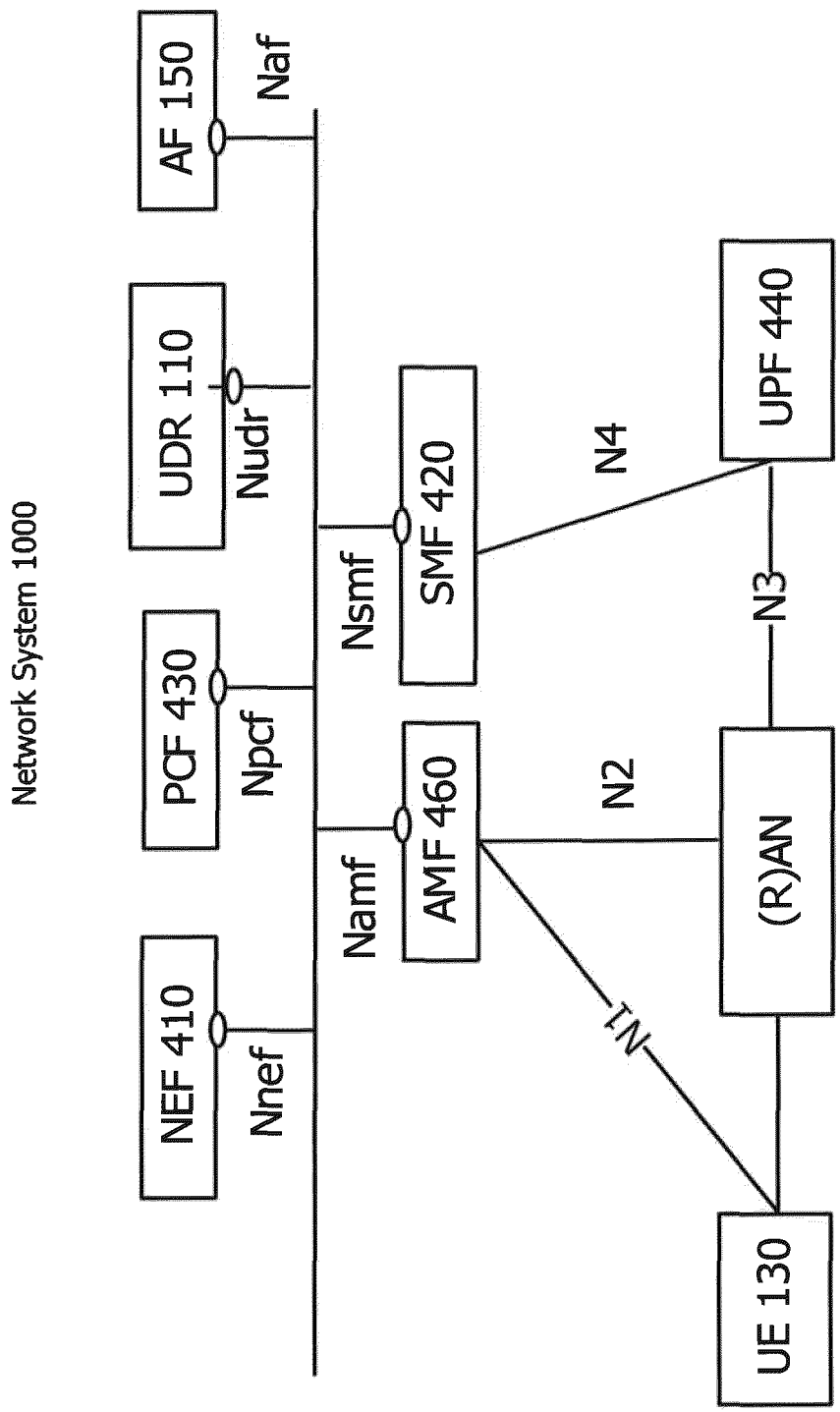
FIG. 4 is a diagram illustrating an exemplary 5G network architecture that can form the basis of realizations of the present disclosure.

FIG. 4 depicts a portion of the 5G reference architecture as defined by 3GPP (see, e.g., Section 4.2.3 of 3GPP TS 23.501 V15.4.0 and later). The relevant architectural core network entities (NFs), core network interfaces and other network entities for some realizations of the present disclosure include:

A User Equipment (UE) as an exemplary subscriber device 130 (see FIG. 1). UE 130 constitutes, for example, an endpoint of an application session that stretches via the access network domain AND (e.g., configured as a radio access network, RAN).

An Application Function (AF) located outside the core network domain CND and typically implemented as, or on, a server 150 operated by a dedicated content provider (e.g., an OTT entity). AF 150 is configured to interact with the core network domain CND via an Naf interface and, in particular, via one or more dedicated exposure APIs.

A Network Exposure Function (NEF) 410, as one example of a cookie information handler 120, has an Nnef interface and supports different functionalities. Specifically, in the context of the present disclosure, NEF 410 acts as an entry point into the core network domain CND for AF 150. AF 150 thus interacts with the core network domain CND through NEF 410. 3GPP has defined an exposure framework with a northbound interface between AF 140 and NEF 410 that supports dedicated APIs. Aspects of such APIs are defined in 3GPP TS 29.522 V17.1.0 (April 2021). In the present context, the cookie handling request is received by NEF 410 via such a dedicated API. In some variants, the API is dedicated to cookie management, including cookie setting and cookie updating. In other variants, a first API is dedicated to cookie setting and a second API is dedicated to cookie updating.

A Session Management Function (SMF) 420 has N4 and Nsmf interfaces. SMF 420 supports procedures such as session establishment, modification and release as well as policy-related functionalities. SMF 420 is configured to receive Policy and Charging Control (PCC) rules from a Policy Control Function (PCF) 430. Moreover, SMF 420 configures a User Plane Function (UPF) 440 accordingly through the N4 interface using the Packet Forwarding Control Protocol (PFCP).

User plane function (UPF) 440 has an N4 interface to SMF 420 and an N3 interface to RAN AND. UPF 440 supports handling of user plane traffic (i.e., digital content) based on the rules received via SMF 420 from PCF 430. Specifically, UPF 440 supports packet inspection in regard to the service traffic (through PDRs), and further supports the application of associated traffic handling actions such as traffic steering, QoS enforcement, charging/reporting, and so on.

PCF 430, as another example of a cookie information handler 120, supports, via an Npcf interface, a unified policy framework to govern the core network domain CND behavior. Specifically, PCF 430 provides policy and charging (PCC) rules to SMF 420 and/or UPF 440 to detect service traffic and enforce policy and charging decisions according to the PCC rules.

A unified data repository (UDR) hosts the subscriber database 110 with subscription-related information for a set of subscribers.

An access and mobility management function (AMF) 460 handles access and mobility for UE 130, In the following description, exemplary 5G signalling realizations implementing cookie information-related aspects will be described with reference to FIGS. 5A and 5B (cookie setting/updating procedure) and FIGS. 6A to 6C (cookie retrieval/sending procedure). It will be apparent to one skilled in the art that similar signalling realizations will apply in case of a 4G or a combined 4G/5G implementation.

Figure 5A:
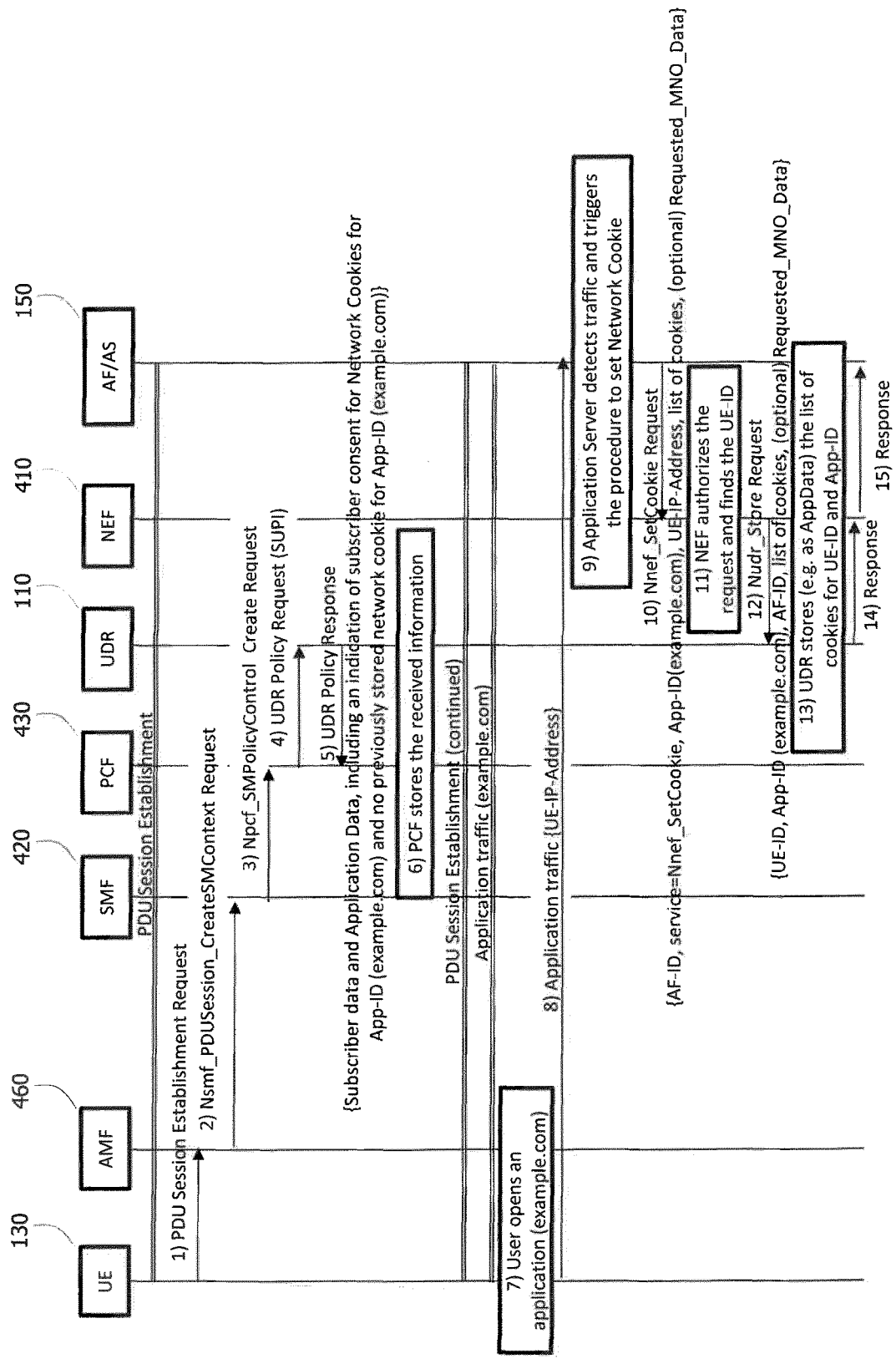
FIGS. 5A-6C are schematic diagram signalling diagrams illustrating further realizations of the present disclosure in the context of the 5G network architecture of FIG. 4.
Figure 5B:
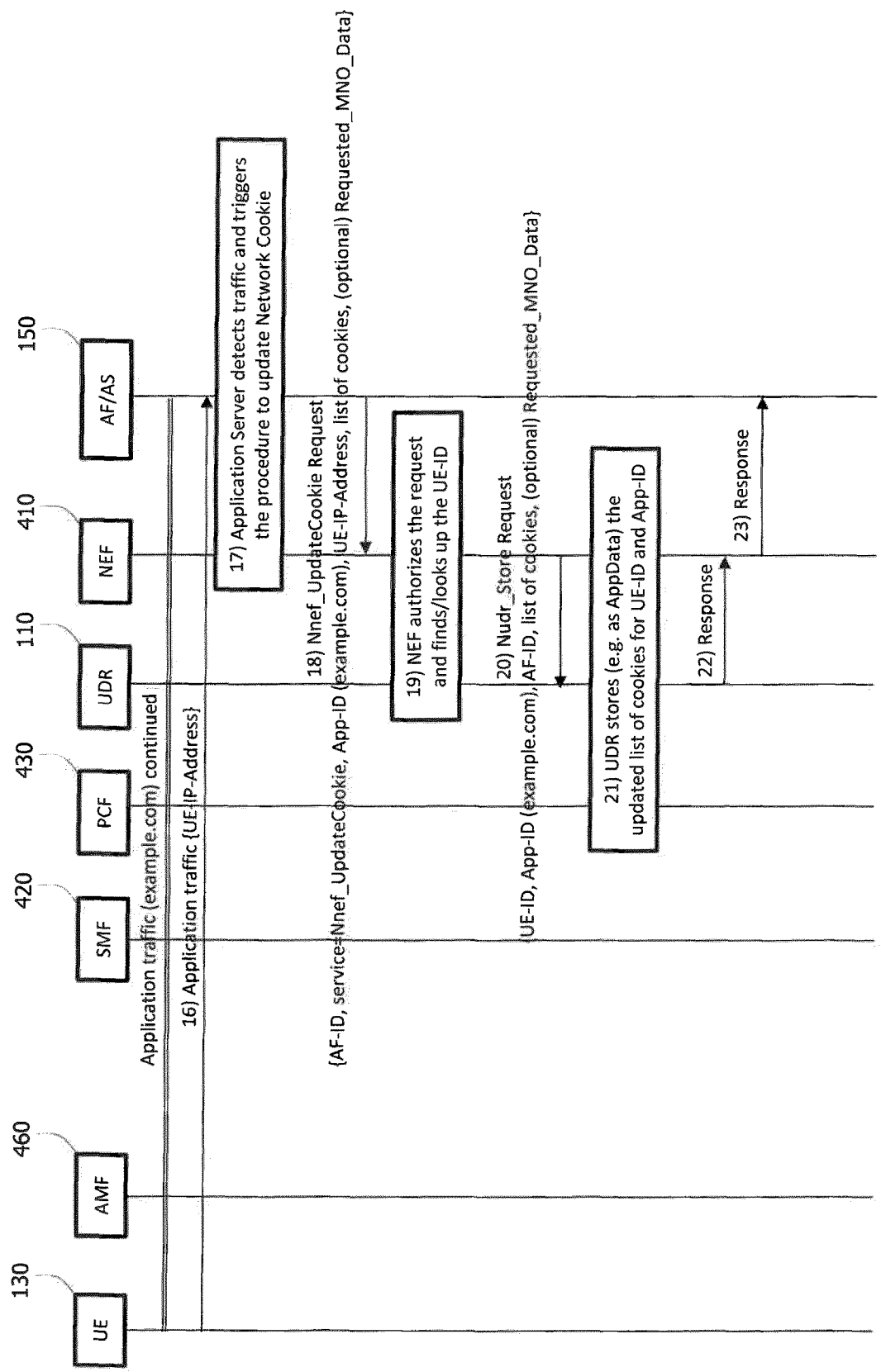

As for the "Set/Update Cookie" procedure of FIGS. 5A and 5B, the content provider domain CPD (i.e., the AF 150) triggers towards the core network domain CND (i.e., NEF 410) a mechanism to set/update CND cookies. It is specifically proposed to define at least one new Nnef API (e.g., Nnef_SetCookie and Nnef_UpdateCookie services or a single Nnef_Cookie service with set and update service operations) for the content provider domain CPD to set/update the cookie(s) on a per-user (i.e., per-subscriber) and per-application basis. Additionally, the content provider domain CPD might request MNO information (e.g., MCC/MNC or PLMN ID, PUI/MSISDN, etc.) to be added in, or appended to, or otherwise returned with the cookie information. NEF 410 will authorize any request received via the new Nnef API and trigger storing in the UDR 110 of the received cookie information on a per-subscriber and per-application basis.

Figure 6A:
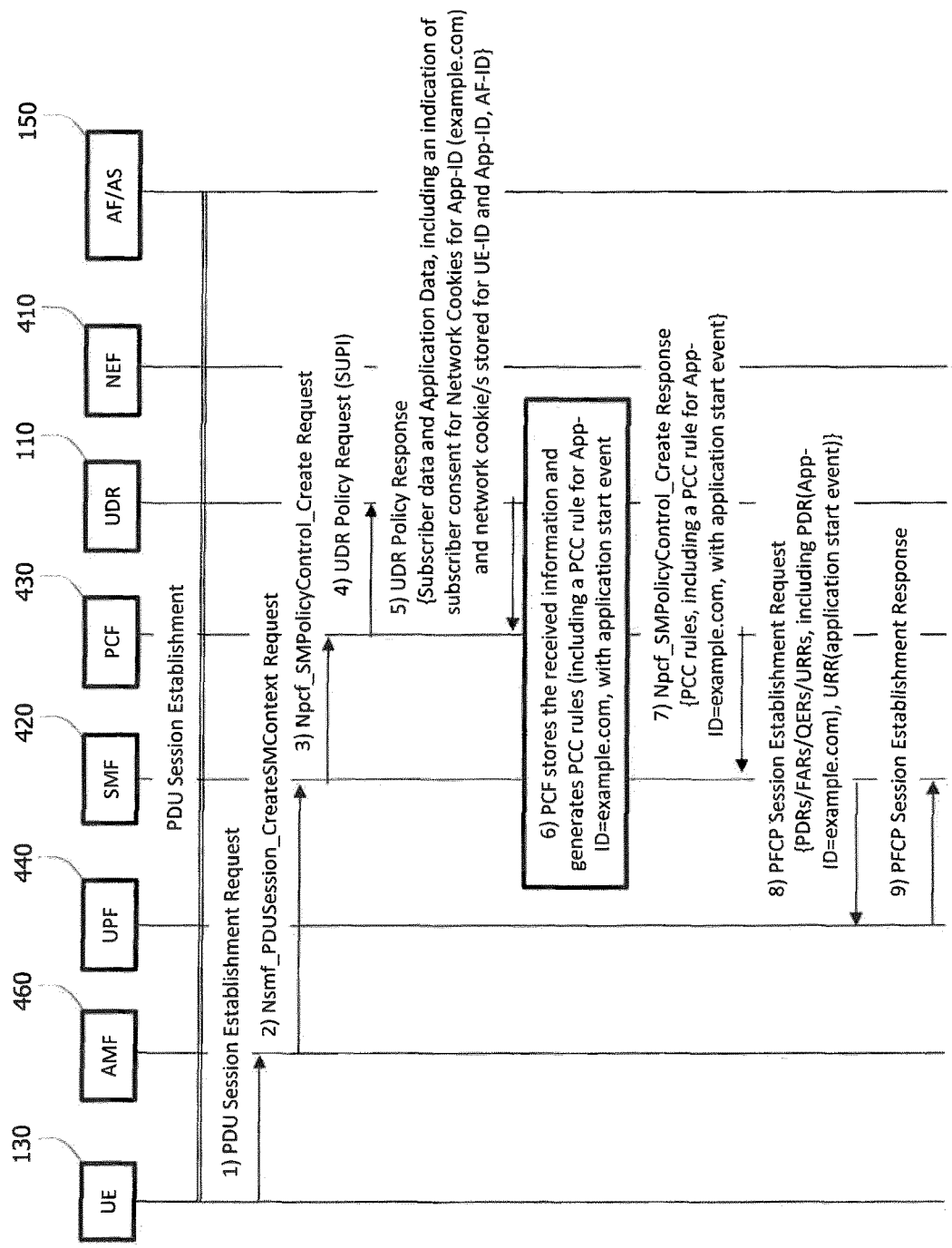
Figure 6B:
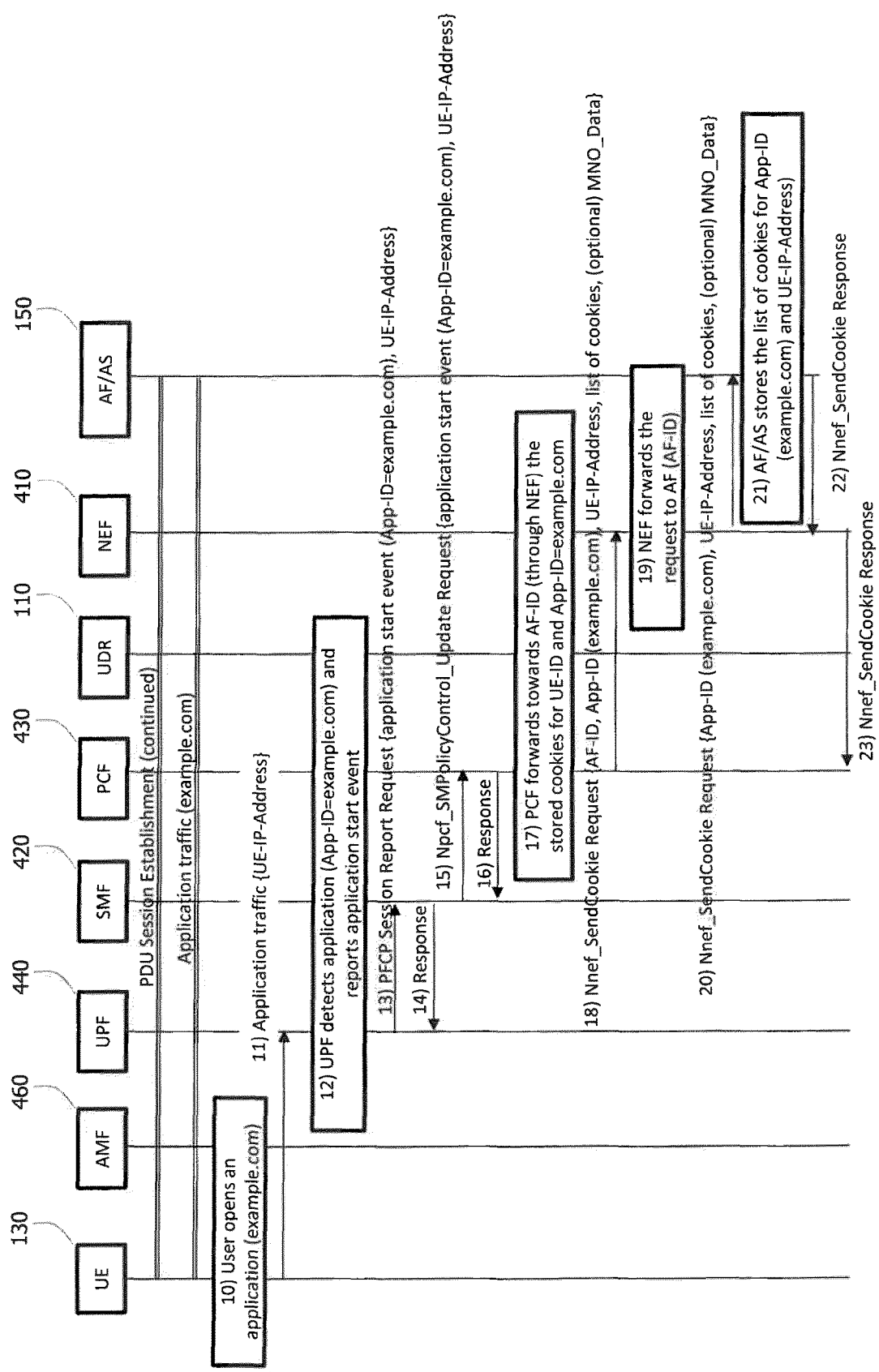
Figure 6C:
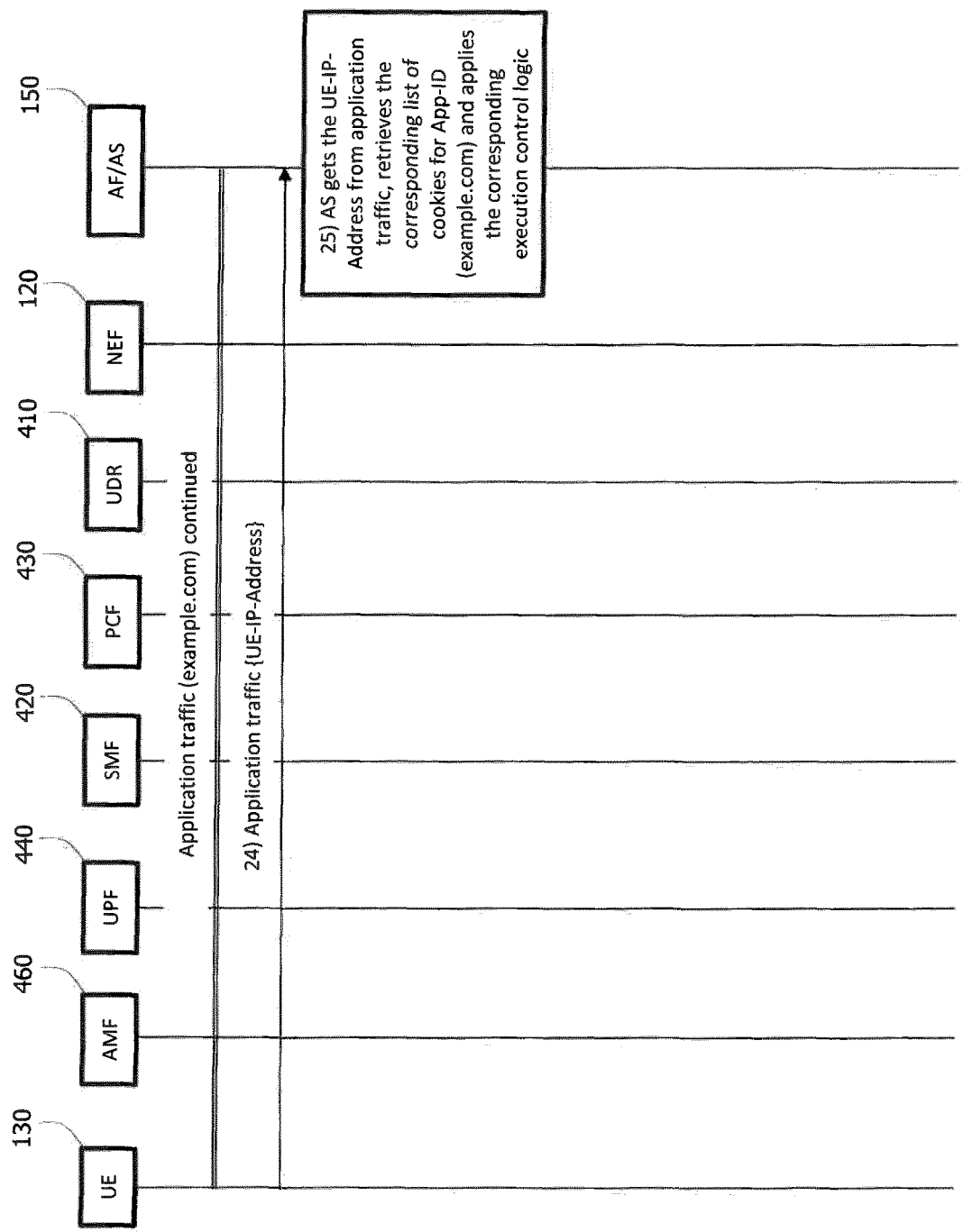

As for the "Send Cookie" procedure of FIGS. 6A to 6C, at protocol data unit (PDU) session establishment, PCF 430 retrieves from UDR 110 the stored cookie(s), i.e., the cookie information, on a per-subscriber and per-application basis and requests SMF 420 and/or UPF 440 to report an application start event. When PCF 430 gets notified on the application start event, PCF 430 sends the stored cookie(s) for the detected application towards AF 150 (through NEF 410). AF 150 receives the cookie information and applies the corresponding control logic (e.g., a target advertisement based on a user identifier comprised by the cookie information).

With reference to the "Set/Update Cookie" procedure of FIGS. 5A and 5B, it will be assumed that there exists an SLA agreement between the content provider and the MNO relative to cookie information handling for content provider's application(s), such as App-ID=example.com. It will further be assumed that there is user consent relative to cookie information storage on a per-subscriber and/or on a per-application basis (e.g., App-ID=example.com).

With reference to steps 1 to 3) of FIG. 5A, UE 130 initially triggers a PDU Session Establishment procedure. As part of this procedure, SMF 420 creates a policy association with PCF 430 (step 3).

In steps 4 to 6) of FIG. 5A, PCF 430 retrieves from UDR 110 the subscriber policy (based on the SUPI associated with UE 130) and/or application data, which is proposed to be extended with a new indication of subscriber consent for network cookies for a given application identifier (e.g., App-ID=example.com). As explained above with reference to step 310 and 312 of FIG. 3A, the subscriber may have pre-configured such consent information in UDR 110 (e.g., cookie storage consent=yes). Additionally, it is in the present example found that there is no previously stored cookie information for App-ID=example.com, that would need to be retrieved and sent. PCF 430 stores the received information from UDR 110.

In steps 7 and 8) of FIG. 5A, UE 130 opens an application (example.com) and sends application traffic towards AF 150 (including the UE IP address in the IP header). See also steps 314 and 316 in FIG. 3A. The application traffic may be encrypted. IN some cases, the application traffic is non-HTTP traffic.

In steps 9 and 10) of FIG. 5A, AF 150 detects the application traffic and obtains (e.g., generates) cookie information in the form of a list of one or more cookies (see step 318 in FIG. 3A). AF 150 then triggers a procedure to set the one or more "network" cookies in the core network domain CND. To this end, the new Nnef API (e.g., Nnef_SetCookie service or a single Nnef_Cookie service with Set service operation) can be used by AF 150 to set the cookie information on a per-subscriber and per-application basis. In order to do this, AF 150 triggers a Nnef_SetCookie Request message towards NEF 410 (see also steps 320 and 322 in FIG. 3A), the message including the following parameters:

AF-ID (i.e., an identifier of the AF 150 or the associate content provider domain CPD)

App-ID (e.g., example.com)

UE-IP-Address (e.g., the IP address as seen by the AF 150, which can be NATed)

List of one or more cookies (i.e., the cookie information that the AF 150 wishes to set)

Optional: Requested_MNO_Data (i.e., the MNO information the content provider requests to be added to the cookie information, e.g., MCC/MNC or PLMN ID, PUI/MSISDN)

In step 11) of FIG. 5A, NEF 410 authorizes the Nnef_SetCookie Request message (e.g., by checking that the AF 150 associated with the AF-ID is authorized to trigger this procedure based on an existing SLA) and looks up an identifier associated with the subscription which corresponds to the UE-IP-Address included in the request. The identifier associated with the subscription may be a UE-ID such as SUPI.

Then, in step 12) of FIG. 5A, NEF 410 requests UDR 110 to store the list of cookies by triggering a Nudr_Store Request message (see also step 324 in FIG. 3A and step 326 and 328 in FIG. 3B). The message will include the following parameters:

AF-ID
App-ID
UE-ID (this is to identify the subscriber, e.g., SUPI)
list of one or more cookies (i.e., the cookie information to be stored by UDR 110 in association with UE-ID and App-ID).
(Optional) Requested_MNO_Data In step 13) of FIG. 5A, UDR 110 stores (e.g., as Application Data) the list of cookies for UE-ID and App-ID (i.e., so as to be retrievable later for a given UE-ID and App-ID). See also step 330 in FIG. 3A. The list of cookies will be stored in UDR 110 in association with the subscription of UE 130 (e.g., in a subscriber data record). Alternatively, the list of cookies could be stored by a different entity of the core network domain CND but in a manner linked to the subscription of UE 130 (using, e.g., a common database "key" such as SUPI).

In steps 14) and 15) of FIG. 5A, UDR 110 answers the message in step 12) indicating successful operation and NEF 410 answers the message in step 10) indicating successful operation.

With reference to steps 16) of FIG. 5B, UE 130 continues using the application (example.com) and sends further application data towards the AF 150 (including the UE IP address in the IP header). See also steps 314 and 316 in FIG. 3A.

In steps 17 and 18) of FIG. 5B, AF 150 detects the application traffic and obtains (e.g., generates) one or more cookies (see step 318 in FIG. 3A). AF 150 then triggers the procedure to update the cookie information in UDR 110 (e.g., as the user has added an item to a cookie-based shopping cart). To this end, again the new Nnef API (e.g., Nnef_UpdateCookie service or a single Nnef_Cookie service with update service operation) is used by the AF 150 (or another entity in the content provider domain CPD) to update the previously set cookie(s) on a per-subscriber and per-application basis. In order to do this, AF 150 triggers a Nnef_UpdateCookie Request message towards NEF 410 (see also steps 320 and 322 in FIG. 3A).

The Nnef_UpdateCookie Request message includes the following parameters:
AF-ID
App-ID (example.com)
UE-IP-Address
list of one or more cookies (i.e., the cookie information AF 150 wants to update)
(Optional) Requested_MNO_Data In step 19) of FIG. 5B, NEF 410 authorizes the request (e.g., by checking that the AF 150 associated with AF-ID is authorized to trigger this procedure based on an existing SLA) and finds the UE-ID (e.g., SUPI) which corresponds to the UE-IP-Address included in the request.

Then, in step 20) of FIG. 5B, NEF 410 requests UDR 110 to store the updated cookie information by triggering a Nudr_Store Request message (see also step 324 in FIG. 3A and step 326 and 328 in FIG. 3B). The message includes the following parameters:
AF-ID
App-ID (example.com)
UE-ID (e.g., SUPI)
list of one or more cookies (i.e., the cookie information AF 150 wants to update)
(Optional) Requested_MNO_Data In step 21) of FIG. 5B, UDR 110 stores (e.g., as Application Data) the updated list of cookies for UE-ID and App-ID, see step 330 in FIG. 3A. In step 22), UDR 110 answers the message in step 20) indicating successful operation. Finally, in step 23), NEF 410 answers the message in step 18) indicating successful operation.

With reference to the "Send Cookie" procedure of FIGS. 6A to 6C, the core network domain CND is configured to send to the content provider domain CPD the stored cookie information on a per-subscriber (per-user) and per-application basis, when the application traffic is detected. As a precondition, it is assumed that there is/are network cookie(s) stored in the UDR 110 for the subscriber and application (e.g., example.com) from one or more previous PDU sessions (see FIGS. 5A and 5B).

With reference to steps 1 to 3) of FIG. 6A, UE 130 triggers a PDU Session Establishment procedure. As part of this procedure, SMF 420 creates a policy association with PCF 430 (step 3) of FIG. 6A). Moreover, as a further part of this procedure, PCF 430 receives identification information (e.g., a SUPI) of the UE 130, see step 332 in FIG. 3B. This identification information can be mapped on a subscription in the subscriber database 110.

Then, in steps 4 and 5) of FIG. 6A, PCF 430 retrieves from UDR 110 the subscriber policy (based on a UE-ID such as SUPI) and/or application data, which in this case indicates that there are network cookie(s) stored for UE-ID and App-ID. Specifically PCF 430 retrieves the cookie information (e.g., as a list of cookies) for UE-ID and App-ID, and also for the AF-ID, see steps 334 and 336 in FIG. 3B. UE-ID, App-ID and AF-ID become known to the core network domain CND in the context of the session establishment procedure and, optionally, related procedures.

In steps 6 and 7) of FIG. 6A, PCF 430 stores the above information and generates suitable policy and charging (PCC) rules (including a PCC rule for App-ID=example.com, including application start event).

In steps 8 and 9) of FIG. 6A, SMF 420 triggers a packet forwarding control protocol (PFCP) Session Establishment procedure towards UPF 440 to indicate the packet detection rules (PDRs) and the corresponding enforcement actions for the PDU session. Specifically, a PDR for App-ID=example.com associated with a usage reporting rule (URR) requesting notification of an application start event is included.

In steps 10 and 11) of FIG. 6B, UE 130 opens an application (example.com) and sends possibly encrypted application data towards AF 150. In steps 12 to 14), UPF 440 detects start of application (App-ID=example.com) and reports an application start event towards SMF 420 by triggering a PFCP Session Report Request including the application start event for App-ID=example.com and the associated UE-IP-Address.

In steps 15 to 16) of FIG. 6B, SMF 420 forwards to PCF 430 the application start event by triggering a Npcf_SM-PolicyControl_Update Request including the application start event for App-ID=example.com and the UE-IP-Address. In steps 17 and 18), PCF 430 forwards towards the AF 150 having the AF-ID (here: AF 150, and through NEF 410) the cookie information as stored in step 6) for UE-ID and App-ID=example.com. In the present case, AF 150 also requested MNO data (see FIG. 5A, step 10), so PCF 430 adds the requested MNO data (as taken from UDR 110, added to the cookie information received from UDR 110 or obtained otherwise). PCF 430 then triggers a Nnef_Send-Cookie Request message towards NEF 410 including the following parameters:

AF-ID.
App-ID (example.com)
UE-IP-Address
list of one or more cookies (i.e., the updated list of cookies for UE-ID and App-ID, see FIG. 5B)
MNO_Data In steps 19 and 20) of FIG. 6B, NEF 410 forwards the above request to AF 150 (as identified by AF-ID), and in step 21) AF 150 stores the list of cookies for App-ID (example.com) and the UE-IP-Address. In step 22), AF 150 answers the message in step 20) indicating successful operation, and in step 23), NEF 410 answers the message in step 18) indicating successful operation.

In steps 24 and 25) of FIG. 6C, AF 150 detects further application traffic and gets the UE-IP-Address from the IP header of an associated data packet. AF 150 then retrieves the corresponding list of cookies for App-ID (example.com) stored in step 21) above and applies the corresponding execution control logic for an interaction of the "example.com" application with UE 130 (e.g., target advertisement or including the shopping cart in the application data towards UE 130).

As has become apparent from the above description of exemplary realizations, the technique presented herein allows an efficient handling of cookie information stored in a core network domain of a wireless communication network.

The invention claimed is:

1. A method of triggering storage of cookie information in a core network domain (CND) of a wireless communication network, the method being performed in the CND and comprising:
receiving, from an entity in a content provider domain (CPD) a cookie handling request including identification information and cookie information, the identification information being configured to be mapped on a subscription in a subscriber database, the cookie information being configured to control execution of an application hosted in the CPD for a wireless subscriber device associated with the subscription, the cookie handling request comprising an application identifier of the application hosted in the CPD to trigger storage of the cookie information in the CND and in association with the application identifier; and
triggering storage of the cookie information in the CND and in association with the subscription.

2. The method of claim 1, wherein the cookie information comprises textual information.

3. The method of claim 1, wherein the cookie information is indicative of an interaction between the application and the subscriber device.

4. The method of claim 1, wherein triggering storage of the cookie information comprises sending a cookie storage request to an entity in the CND, the cookie storage request including the identification information, or information derived therefrom, and the cookie information.

5. The method of claim 1, wherein the cookie handling request comprises one or more of:
an identifier of server hosting the application; and
a specification of a cookie handling-related service.

6. The method of claim 5, wherein the specification of the cookie handling-related service refers to one of setting the cookie information in the CND; and updating cookie information stored in the CND with the cookie information included in the cookie handling request.

7. The method of claim 1, wherein the cookie handling request is received from the CPD entity responsive to the subscriber device interacting with the application in the CPD.

8. The method of claim 1, wherein the cookie handling request is received via an application programming interface, API, and wherein the API is one of:
dedicated to cookie management, including cookie setting and cookie updating;
dedicated to cookie setting; and dedicated to cookie updating.

9. The method of claim 1, wherein the cookie handling request is received by a network exposure function (NEF) of a 5th Generation (5G) enabled CND or a service capability exposure function gateway (SCEF) of a 4th Generation (4G) enabled CND.

10. The method of claim 1, further comprising authorizing the cookie handling request to obtain an authorization result, wherein storage of the cookie information in the CND is triggered dependent on the authorization result.

11. The method of claim 10, wherein authorizing the cookie handling request includes checking existence of at least one of:
a service level agreement (SLA) between an operator of the CND and an operator of the
CPD; and subscriber consent to cookie storage in the CND.

12. The method of claim 11, wherein one or more applications are hosted in the CPD, and wherein at least one of the SLA and the subscriber consent is on a per-application basis.

13. The method of claim 1, wherein the cookie handling request includes an information request for at least one of:
subscription information stored in the subscriber database; and network-related information pertaining to the wireless communication network.

14. The method of claim 13, wherein the information request relates to one or more of a mobile country code, MCC, a mobile network code, MNC, a public user identity, PUI, a mobile station integrated services network, MSISDN, identifier, and a public land mobile network, PLMN, identifier.

15. The method of claim 1, wherein the identification information is an internet protocol (IP) address assigned to the subscriber device, and wherein the method further comprises mapping the IP address on a subscription identifier prior to triggering storage of the cookie information in the subscriber database.

16. The method of claim 15, wherein the subscription identifier is one of a subscription permanent identifier (SUPI) and an international mobile subscriber identifier (IMSI).

17. The method of claim 1, wherein the subscriber database is hosted by a unified data repository (UDR) of a 5G enabled CND or by a home subscriber server HSS) of a 4G enabled CND.

18. The method of claim 1, wherein the cookie information is stored as application data in the subscriber database.

19. An apparatus for of triggering storage of cookie information in a core network domain (CND) of a wireless communication network, the apparatus being a CND entity and configured to:
receive, from an entity in a content provider domain (CPD) a cookie handling request including identification information and cookie information, the identification information being configured to be mapped on a subscription in a subscriber database, the cookie information being configured to control execution of an application hosted in the CPD for a wireless subscriber device associated with the subscription, the cookie handling request comprising an application identifier of the application hosted in the CPD to trigger storage of the cookie information in the CND and in association with the application identifier; and trigger storage of the cookie information in the CND and in association with the subscription.

20. A non-transitory computer readable medium having a control program stored thereon, the control program comprising instructions that, when executed by processing circuitry of a core network domain (CND) entity, causes the CND entity to:

receive, from an entity in a content provider domain (CPD) a cookie handling request including identification information and cookie information, the identification information being configured to be mapped on a subscription in a subscriber database, the cookie information being configured to control execution of an application hosted in the CPD for a wireless subscriber device associated with the subscription, the cookie handling request comprising an application identifier of the application hosted in the CPD to trigger storage of the cookie information in the CND and in association with the application identifier; and trigger storage of the cookie information in the CND and in association with the subscription.

* * * * *